US008538606B2

(12) United States Patent
Janson et al.

(10) Patent No.: US 8,538,606 B2
(45) Date of Patent: Sep. 17, 2013

(54) SYSTEMS, METHODS, AND APPARATUS FOR SENSING FLIGHT DIRECTION OF A SPACECRAFT

(75) Inventors: Siegfried W. Janson, Los Angeles, CA (US); Jerome K. Fuller, Van Nuys, CA (US)

(73) Assignee: The Aerospace Corporation, El Segundo, CA (US)

(*) Notice: Subject to any disclaimer, the term of this patent is extended or adjusted under 35 U.S.C. 154(b) by 270 days.

(21) Appl. No.: 12/938,504

(22) Filed: Nov. 3, 2010

(65) Prior Publication Data

US 2012/0109425 A1    May 3, 2012

(51) Int. Cl.
*G06F 17/00* (2006.01)
*B64G 1/36* (2006.01)
*G01C 21/02* (2006.01)

(52) U.S. Cl.
USPC .......... 701/13; 701/523; 701/531; 244/158.1; 382/325

(58) Field of Classification Search
USPC ............. 701/1, 3, 13, 14, 116, 400, 500, 501, 701/513, 514, 523, 530, 531; 244/158.1, 244/158.6, 164, 165; 382/107, 312, 325
See application file for complete search history.

(56) References Cited

U.S. PATENT DOCUMENTS

| 4,432,060 | A | * | 2/1984 | Cargille ........................... 701/3 |
| 4,658,361 | A | | 4/1987 | Kasaka et al. |
| 5,597,142 | A | * | 1/1997 | Leung et al. .................. 244/164 |
| 5,899,945 | A | * | 5/1999 | Baylocq et al. .................... 701/4 |
| 6,113,034 | A | * | 9/2000 | Basuthakur et al. .......... 244/166 |
| 6,501,419 | B2 | | 12/2002 | Davis et al. |
| 6,541,762 | B2 | | 4/2003 | Kang et al. |
| 6,967,321 | B2 | | 11/2005 | Leong et al. |
| 7,244,925 | B2 | | 7/2007 | Xie |

OTHER PUBLICATIONS

Agilent ADNS-2620 Optical Mouse Sensor Data Sheets, Agilent technologies (27 pp), Mar. 13, 2003, Agilent Technologies, Inc.

* cited by examiner

*Primary Examiner* — Thomas Tarcza
*Assistant Examiner* — Edward Pipala
(74) *Attorney, Agent, or Firm* — Sutherland, Asbill & Brennan LLP

(57) ABSTRACT

Certain embodiments of the invention may include systems, methods, and apparatus for sensing flight direction of a spacecraft. According to an example embodiment of the invention, a method is provided for determining flight direction of a spacecraft. The method includes providing at least one imaging detector associated with a spacecraft; imaging at least a portion of a celestial body onto the at least one imaging detector; acquiring, by the at least one imaging detector, sequential images of at least a portion of the celestial body; and determining the spacecraft flight direction relative to the celestial body based at least in part on processing the sequential images, wherein the processing is performed by one or more computer processors.

20 Claims, 4 Drawing Sheets

SYSTEMS, METHODS, AND APPARATUS FOR SENSING FLIGHT DIRECTION OF A SPACECRAFT

FIELD OF THE INVENTION

This invention generally relates to spacecraft, and more particularly, to systems, methods, and apparatus for sensing flight direction of a spacecraft.

BACKGROUND OF THE INVENTION

Small satellites (also known as PicoSats, NanoSats, or CubeSats) have low weights and small sizes, to reduce launch cost to orbit. A CubeSat, for example, weighs less than a kilogram, occupies a volume of about 1 liter, and has a limited amount of available room for auxiliary systems, such as a flight direction sensor system for efficient orbital positioning. For example, thrusters associated with the satellite need to be coordinated with the direction of travel (or the so-called ram direction) to apply thrust either in the ram direction (for decreasing the orbit radius) or in the anti-ram direction (to increase the orbit radius).

Previous approaches to flight direction sensing have involved calculation of the satellite attitude via combinations of sun, star, Earth horizon, and other sensors. Sun sensors, for example, can measure the angular position of the sun along two orthogonal directions with respect to the spacecraft body. Star sensors may calculate the angles between visible stars, and may search a database of known star positions to determine the spacecraft orientation in inertial space. Such approaches often require multiple sensors and complex imaging systems that can be prohibitively bulky.

The atmosphere rotates with the planet, so spacecraft in low-earth-orbit fly through this atmosphere at 7 to 8 km/s. Pressure sensing approaches to determining flight direction include direct physical sensing of the pressure difference between leading and trailing edges of the spacecraft, or monitoring neutral wind direction. These approaches work best at low (less than 500-km) altitudes where the atmospheric density is readily detectable. The atmospheric density drops rapidly with increased altitude, and therefore, detecting flight direction using pressure sensing becomes almost impossible at altitudes greater than 1,000 km.

BRIEF SUMMARY OF THE INVENTION

Some or all of the above needs may be addressed by certain embodiments of the invention. Certain embodiments of the invention may include systems, methods, and apparatus for sensing flight direction of a spacecraft.

According to an example embodiment of the invention, a method is provided for determining flight direction of a spacecraft. The method includes providing at least one imaging detector associated with a spacecraft; imaging at least a portion of a celestial body onto the at least one imaging detector; acquiring, by the at least one imaging detector, sequential images of at least a portion of the celestial body, and determining the spacecraft flight direction relative to the celestial body based at least in part on processing the sequential images, wherein the processing is performed by one or more computer processors.

According to another example embodiment, a system is provided for determining flight direction of a spacecraft. The system includes a nadir direction finder, a power source, at least one on-board gyroscope, and at least one imaging detector attached to the spacecraft. The imaging detector is configured to acquire sequential images of at least a portion of a celestial body, and further configured to process the sequential images. The system also includes at least one flight computer in communication with the at least one imaging detector, and configured to execute computer-executable instructions for determining the spacecraft flight direction relative to the celestial body based at least in part on the processing of the sequential images.

According to another example embodiment, an apparatus is provided for determining a flight direction. The apparatus includes at least one imaging detector attached to a spacecraft. The imaging detector is configured to acquire sequential images of at least a portion of a celestial body, and is further configured to process the sequential images. The apparatus also includes at least one flight computer in communication with the at least one imaging detector, and configured to execute computer-executable instructions for determining the spacecraft flight direction relative to the celestial body based at least in part on the processing of the sequential images.

Other embodiments and aspects of the invention are described in detail herein and are considered a part of the claimed invention. Other embodiments and aspects can be understood with reference to the following detailed description, accompanying drawings, and claims.

BRIEF DESCRIPTION OF THE FIGURES

Reference will now be made to the accompanying drawings, which are not necessarily drawn to scale, and wherein.

DETAILED DESCRIPTION OF THE INVENTION

Figure 1:
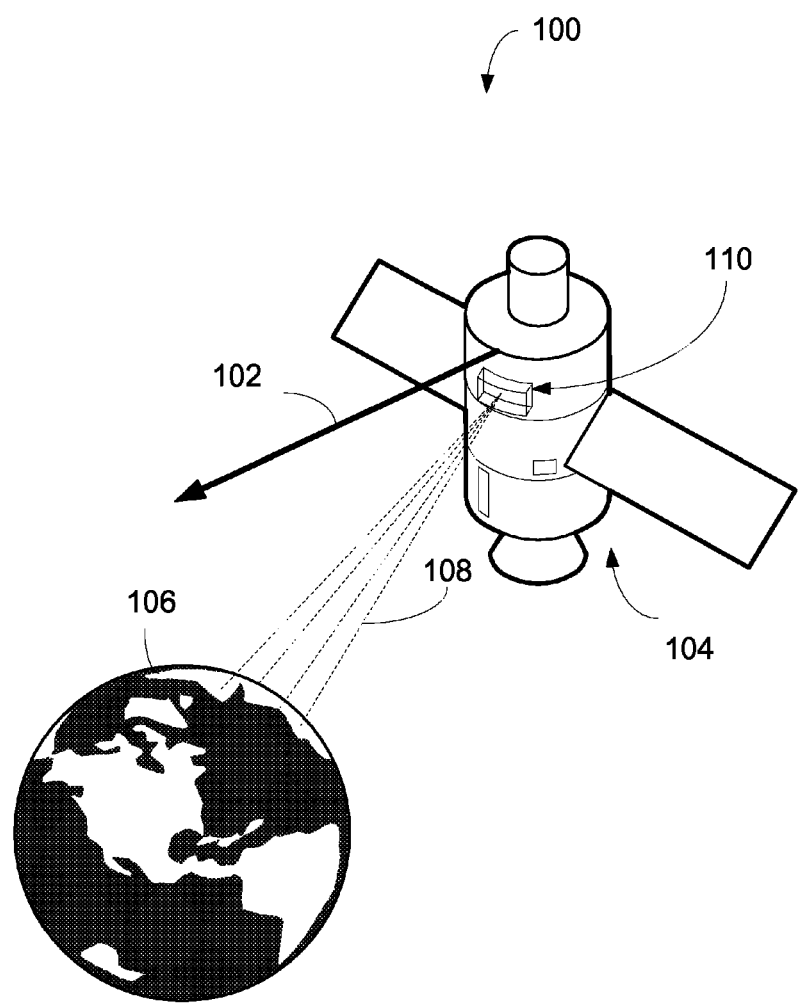
FIG. 1 is a diagram of an illustrative spacecraft flight direction sensing system, according to an example embodiment of the invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable determining a flight direction (or ram direction) of a spacecraft. According to example embodiments of the invention, the flight direction may be determined by sequentially obtaining and processing images of a celestial body. According to example embodiments of the invention, the images may be obtained and processed via one or more small, lightweight imaging sensors and processors, such as the integrated sensor(s) and processor(s) that are the navigation sensors used in certain computer optical mice to detect movement and direction of the mouse as it is dragged along a surface. According to example embodiments of the invention, data including image feature position (X, Y), position change ($\Delta X$, $\Delta Y$), velocity, average image brightness, and/or image granularity may be utilized in determining the flight direction.

According to an example embodiment, no orbital data, time information, or instantaneous position information are required to determine the flight direction. However, according to an example embodiment of the invention, a nadir direction finder (e.g., an Earth horizon sensor) may be used in combination with the imaging sensor to determine the flight direction clock angle around the nadir direction. In certain example embodiments of the invention, the nadir direction finder may include a celestial body horizon sensor. In accordance with example embodiments of the invention, the nadir direction finder may be utilized to determine the direction towards the center of the celestial body.

According to an example embodiment, flight direction information may be obtained, at least in part, by using components similar to those found in an optical mouse. For example, optical mice may include an imager with a limited number of pixels (typically less than 2,000), and the imager may operate at high frame rates. In certain embodiments, a dedicated, application-specific integrated circuit (ASIC) digital signal processor (DSP) may perform rapid calculations on this limited image in a highly efficient manner. In certain embodiments of the invention, a spacecraft can use an on-board imaging lens or a modified optical mouse imager to obtain sequential pixel subsets of a celestial body image. The movement of the pixel subset may be processed with the attendant DSP to determine a flight direction (or ram direction) of the spacecraft. In principle, this sensor should function at any inclination at any altitude below the geostationary orbit.

Various components for determining the flight direction of a spacecraft, according to example embodiments of the invention, will now be described with reference to the accompanying figures.

FIG. 1 illustrates an example diagram of an illustrative spacecraft flight direction sensing system 100, according to an example embodiment of the invention. In an example embodiment, flight direction 102 and/or orbit speed of a spacecraft 104 may be determined relative to a celestial body 106 by sequentially capturing images 108 of at least a portion of the celestial body 106 via an imaging detector 110 attached to or part of the spacecraft 104, and by processing the sequential images. For example, the sequential images or frames of the imaged celestial body may be analyzed to determine the relative movement of imaged features between frames.

Figure 2:
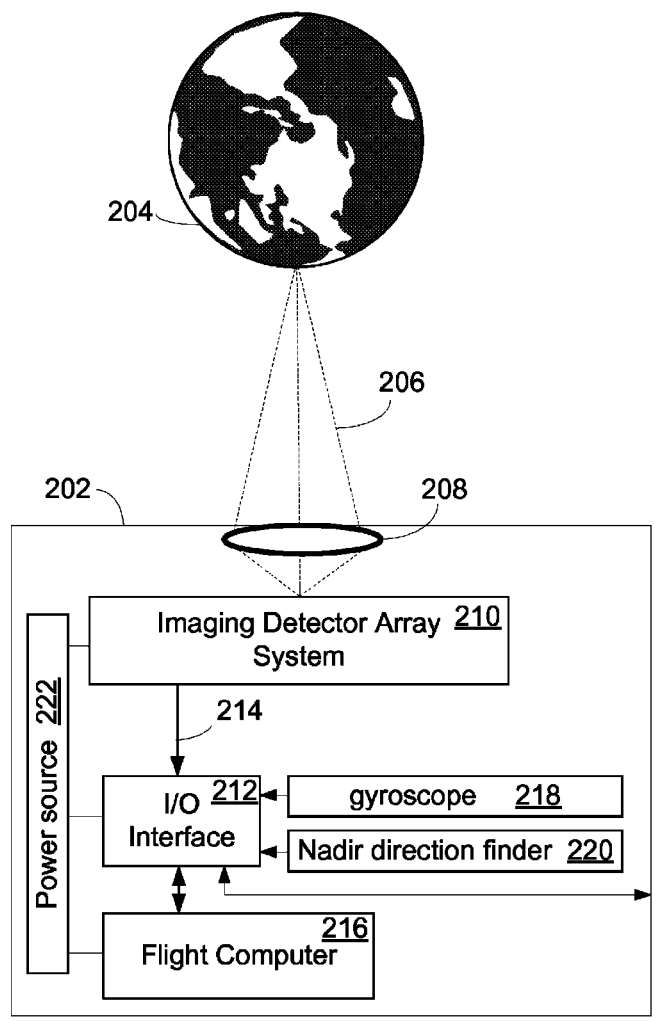
FIG. 2 is a block diagram of an illustrative flight direction and control system, according to an example embodiment of the invention.

FIG. 2 depicts an example block diagram of an illustrative flight direction and control system 202. According to example embodiments of the invention, a lens 208 may be utilized to image at least a portion of a celestial body 204 onto an imaging detector array system 210, which may extract image feature raw data, coordinate position (X, Y), position change ($\Delta X$, $\Delta Y$), and/or image feature velocity information. The extracted information 214 may be provided to a flight computer 216 to compute the spacecraft flight direction.

According to example embodiments of the invention, additional information may be used in combination with the extracted information 214 by the flight computer 216 in determining the spacecraft flight direction. For example, an on-board gyroscope 218 may measure the spacecraft rotation about one or more rotational axes. The gyroscope information may be utilized by the flight computer 216, for example, to factor-out the effects of spacecraft rotation on the image feature positional information 214. In another example embodiment of the invention, a nadir direction finder 220 may be utilized to determine the center of the celestial body 204. According to example embodiments, the information provided by the nadir direction finder 220 may also be utilized by the flight computer 216, for example, to factor-out the effects of spacecraft rotation on the image feature positional information 214.

In example embodiments of the invention, the spacecraft flight direction and control system may include one or more input/output interfaces 212 for communication among the flight computer 216, the imaging detector array system 210, the gyroscope 218, the nadir direction finder 220, and other systems. Additionally, according to an example embodiment of the invention, a power source 222 may be utilized to provide voltage and current to the components associated with the spacecraft flight direction and control system 202. According to example embodiments of the invention, the power source 222 may include one or more of a battery, a fuel cell, a solar cell, or a super-capacitor. As desired, embodiments of the invention may include the spacecraft flight direction and control system 202 with more or less of the components illustrated in FIG. 2.

According to example embodiments of the invention, the imaging detector array system 210 may occupy a volume less than about 10 mm by about 15 mm by about 5 mm.

Figure 3:
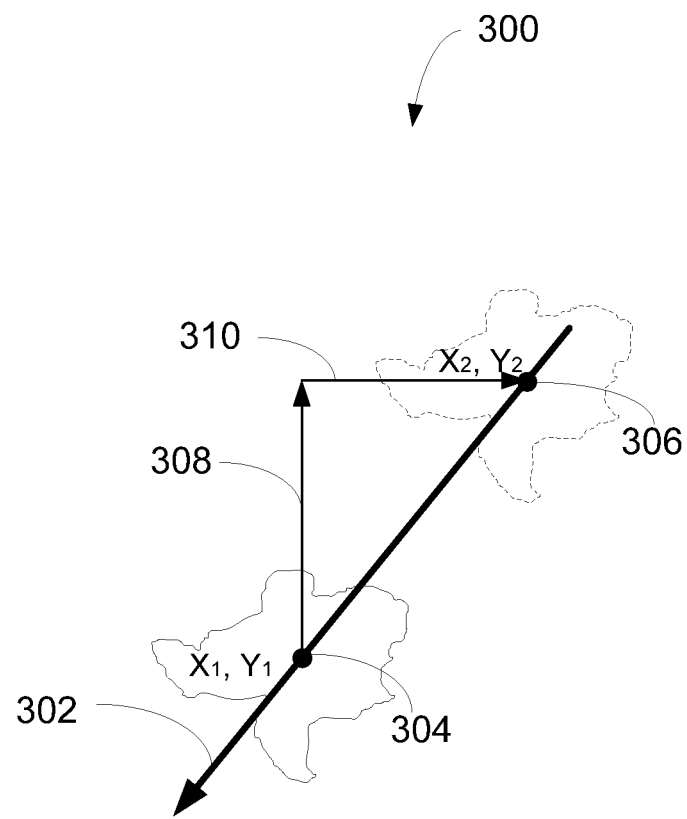
FIG. 3 is a diagram illustrating how flight direction may be determined from image feature movement, according to an example embodiment of the invention.

FIG. 3 shows an example illustration of how the flight direction may be determined from image feature movement, according to an example embodiment of the invention. In an example embodiment, determining the flight direction 302 relative to the celestial body (as in celestial body 204 of FIG. 2) may include determining orthogonal position changes 308, 310 of at least one image feature 304 in an image frame associated with the celestial body relative to the same image feature 306 in a subsequent frame. For example, an image feature 304 in an initial frame of a captured image may have associated initial coordinates $X_1$ and $Y_1$. According to an example embodiment of the invention, an image feature 306 in a subsequent frame may have associated coordinates $X_2$ and $Y_2$. The position change in the image feature between the initial and subsequent frames can be expressed as $\Delta X$ 310 and $\Delta Y$ 308, where $\Delta X = X_2 - X_1$ and $\Delta Y = Y_2 - Y_1$. In an example embodiment of the invention, the flight direction 302 may be determined as the negative vector sum of $\Delta X$ 310 and $\Delta Y$ 308.

In certain example embodiments of the invention, the sequential images may be acquired and processed by the imaging detector array system 210, which may be a single integrated circuit. According to example embodiments of the invention, the imaging detector array system 210 may acquire and process the sequential images while drawing less than 50 mA of current. In certain example embodiments of the invention, the imaging detector array system 210 may include a shutterless optical imaging detector array. According to example embodiments of the invention, the imaging detector array system 210 may acquire and process the sequential images while drawing less than 250 mA of current.

In other example embodiments of the invention, the sequential images may be acquired by the imaging detector array system 210, and certain information may be extracted for additional processing by the flight computer 216. For example the imaging detector array system 210 may extract image feature raw data, coordinate position (X, Y), position change ($\Delta X$, $\Delta Y$), and/or image feature velocity information, etc. The extracted information 214 may be provided to a flight computer 216 for further processing to compute the spacecraft flight direction. In certain embodiments of the invention, the spacecraft flight direction and control system 202 may include a clock for providing timing information to the flight computer 216, and may be utilized in combination with the extracted information 214 to compute spacecraft flight speed.

Figure 4:
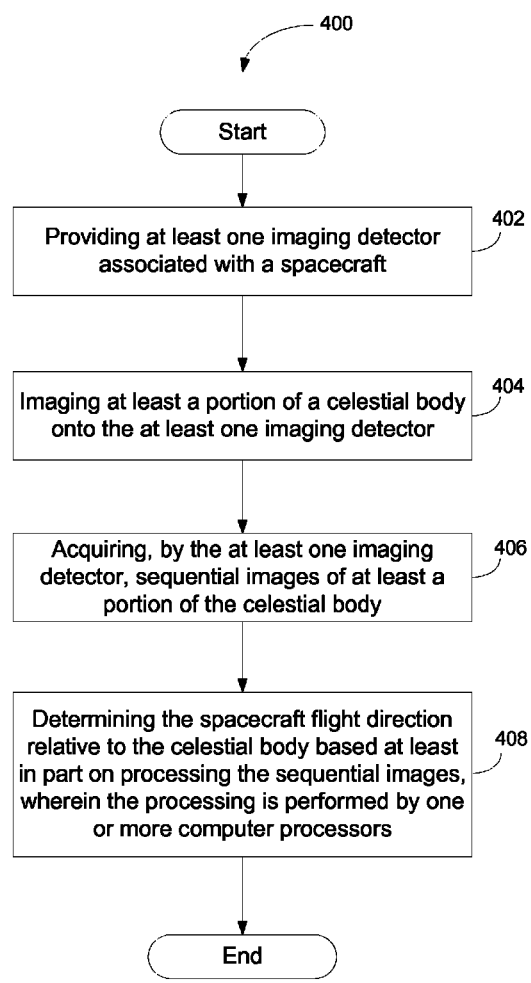
FIG. 4 is a flow diagram of an example method for determining the flight direction of a spacecraft, according to an example embodiment of the invention.

An example method 400 for determining flight direction of a spacecraft will now be described with reference to the flow diagram of FIG. 4. The method 400 starts in block 402 and includes providing at least one imaging detector associated with a spacecraft. In block 404, and according to an example embodiment of the invention, the method 400 includes imaging at least a portion of a celestial body onto the at least one imaging detector. In block 406, and according to an example embodiment, the method includes acquiring, by the at least one imaging detector, sequential images of at least a portion of the celestial body. In block 408, and according to an example embodiment of the invention, the method 400 includes determining the spacecraft flight direction relative to the celestial body based at least in part on processing the sequential images, wherein the processing is performed by one or more computer processors. The method 400 ends after block 408.

Accordingly, example embodiments of the invention can provide the technical effects of creating certain systems and methods that provide small and lightweight flight direction detectors and systems for spacecraft. Example embodiments of the invention can provide the further technical effects of providing systems and methods for providing cost-effective flight direction detectors and systems for spacecraft.

In example embodiments of the invention, the spacecraft flight direction and control system 202 may include any number of software applications that are executed to facilitate any of the operations.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose flight computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method for determining flight direction of a spacecraft, comprising:
   providing at least one imaging detector associated with a spacecraft;
   imaging at least a portion of a celestial body onto the at least one imaging detector;
   acquiring, by the at least one imaging detector, sequential images of at least a portion of the celestial body; and
   determining the spacecraft flight direction relative to the celestial body based at least in part on processing the sequential images, wherein the processing is performed by one or more computer processors.

2. The method of claim 1, wherein determining the spacecraft flight direction relative to the celestial body comprises determining position changes of at least one image feature in an image frame associated with the celestial body relative to the at least one image feature in a previous or subsequent frame.

3. The method of claim 1, wherein the acquiring sequential images and the determining the flight direction is performed within a single integrated circuit.

4. The method of claim 1, wherein providing the at least one imaging detector further comprises providing at least one imaging lens and a shutterless optical imaging detector array.

5. The method of claim 1, wherein the acquiring and processing the sequential images draws less than 50 mA of current.

6. The method of claim 1, further comprising determining the spacecraft flight speed relative to the celestial body based at least in part on processing the sequential images.

7. The method of claim 1, wherein determining the spacecraft flight direction relative to the celestial body is further based at least in part on a measured rotation rate of the spacecraft by at least one on-board gyroscope or nadir sensor.

8. A spacecraft comprising:
a propulsion system;
a power source;
at least one imaging detector, the imaging detector configured to acquire sequential images of at least a portion of a celestial body, and further configured to generate a first output comprising the sequential images; and
at least one flight computer in communication with the at least one imaging detector, and configured to determine a spacecraft flight direction relative to the celestial body based at least in part on the first output comprising the sequential images.

9. The spacecraft of claim 8, wherein the first output comprises one or more of raw image data, coordinate position (X, Y), position change (ΔX, ΔY), image feature velocity information, acquired images, or data derived from the acquired images.

10. The spacecraft of claim 8, wherein the at least one flight computer is further configured to determine the spacecraft flight direction relative to the celestial body based at least in part on determining position changes of at least one image feature in an image frame associated with the celestial body relative to the at least one image feature in a previous or subsequent frame.

11. The spacecraft of claim 8, wherein at least one imaging detector is configured to acquire the sequential images and process the sequential images within a single integrated circuit.

12. The spacecraft of claim 8, wherein the at least one imaging detector draws less than 50 mA of current while acquiring the sequential images.

13. The spacecraft of claim 8, wherein the at least one flight computer is further configured to determine the spacecraft flight speed relative to the celestial body based at least in part on processing the sequential images.

14. The spacecraft of claim 8, further comprising one or more of a nadir sensor or a gyroscope, and wherein the at least one flight computer is further configured for determining the spacecraft flight direction relative to the celestial body based at least in part on a measured rotation rate of the spacecraft by the nadir sensor or gyroscope.

15. An apparatus for determining a flight direction, comprising:
at least one imaging detector, the imaging detector configured for acquiring sequential images of at least a portion of a celestial body, and further configured for processing the sequential images; and
at least one flight computer in communication with the at least one imaging detector, and configured to determine the spacecraft flight direction relative to the celestial body based at least in part on the sequential images.

16. The apparatus of claim 15, wherein the at least one flight computer is further configured for determining a spacecraft flight direction relative to the celestial body based at least in part on determining position changes of at least one image feature in an image frame associated with the celestial body relative to the at least one image feature in a subsequent frame.

17. The apparatus of claim 15, wherein at least one imaging detector is configured to acquire the sequential images and process the sequential images within a single integrated circuit while drawing less than 50 mA of current.

18. The apparatus of claim 15, further comprising at least one imaging lens and a shutterless optical imaging detector array.

19. The apparatus of claim 15, wherein the at least one flight computer is further configured to determine a spacecraft flight speed relative to the celestial body based at least in part on processing the sequential images.

20. The apparatus of claim 15, wherein the at least one flight computer is further configured to determine a spacecraft flight direction relative to the celestial body based at least in part on a measured rotation rate of the spacecraft by at least one on-board gyroscope or a nadir sensor.

* * * * *